Dec. 6, 1966  T. G. HILL  3,289,980
THRUST SYSTEM FOR VTOL AIRCRAFT
Filed Dec. 7, 1964  2 Sheets-Sheet 1

INVENTOR.
THOMAS GARDNER HILL
BY
Agent

Dec. 6, 1966 T. G. HILL 3,289,980
THRUST SYSTEM FOR VTOL AIRCRAFT
Filed Dec. 7, 1964 2 Sheets-Sheet 2
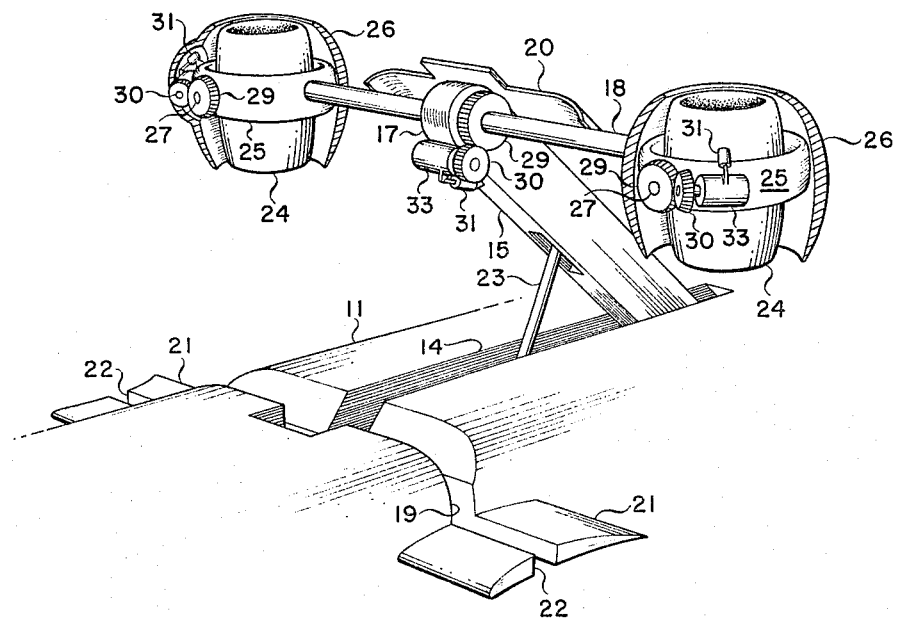
Fig. 5
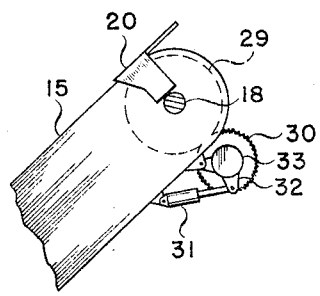
Fig. 6
Fig. 2
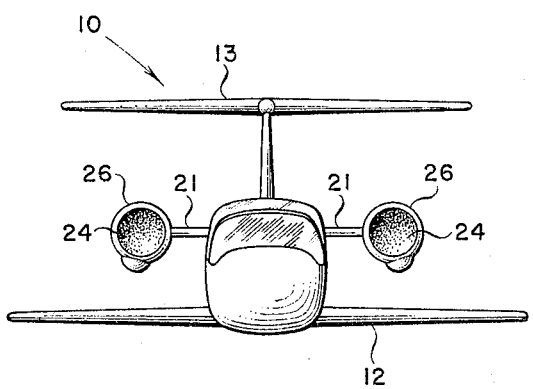
INVENTOR.
THOMAS GARDNER HILL
BY
Agent United States Patent Office 3,289,980
Patented Dec. 6, 1966

3,289,980
THRUST SYSTEM FOR VTOL AIRCRAFT
Thomas Gardner Hill, Atlanta, Ga., assignor to Lockheed Aircraft Corporation, Burbank, Calif.
Filed Dec. 7, 1964, Ser. No. 416,257
9 Claims. (Cl. 244—56)

This invention relates generally to thrust systems for vertical rising and landing aircraft commonly referred to as VTOL aircraft and more particularly to such a system whereby greater operating control and efficiency of the aircraft is obtained in the vertical flight or hover mode.

The major problems encountered with VTOL aircraft have been largely centered around control and stability of the aircraft in the vertical flight or hover mode and during the transition period from the vertical to the horizontal or level-flight mode. In the vertical flight or hover mode, angular deviations of the aircraft particularly pitch and roll occur which alter the direction of the sustaining force or lift. This results in a loss of effective force or lift introducing a force urging the aircraft to translate, which results in dynamic instability of the aircraft creating control problems.

Efforts heretofore made to solve these problems in vertical flight or hover control have involved complex mechanisms to detect angular deviations and differentially adjust lift-producing devices to establish a compensating direction of lift or sustaining force. This invariably creates a new set of problems to insure the proper operation of such mechanisms, adds additional weight to the aircraft, reduces reliability, requires valuable space provisions within the aircraft, adds to cost, and causes the installation of considerable excess lift power to provide the controlling forces.

The present invention is therefore directed largely to the solution of the foregoing control and lift problems of VTOL aircraft. To this end it is herein proposed to so mount one or more thrust-producing devices on the aircraft that each such device is automatically maintained at all times during hover in a vertical position, i.e., in a position with its thrust in the direction of the earth's gravitational forces whereby the vector sum of all lift forces produced thereby acts in a fixed direction regardless of the attitude of the aircraft. By selectively locating this direction of the lift forces with respect to the center of gravity of the aircraft, the effective lift strength of these forces on the aircraft is constant regardless of the attitude of the aircraft. Thus, the aircraft is subjected to no lift losses or translating forces when it changes angle in roll or pitch during maneuvers in the vertical flight or hover mode.

The instant invention further contemplates the positioning of the thrust-producing device above and in spaced relation to the aircraft whereby the aircraft is free to swing like a pendulum therefrom assuring its complete freedom of mobility as well as its static and dynamic stability during the hover mode. This has the further advantage of accommodating a mount for the device to move it from its lift-producing or vertical position to a position more compatible with the horizontal flight mode of the aircraft. Thus, the thrust-producing device may thereby be either fully retracted into and stowed within the aircraft, or disposed in a fixed horizontal position, i.e., in a position with its thrust perpendicular to the direction of the earth's gravitational forces to drive the aircraft in forward flight. When fully retracted within the aircraft, other power-producing means would be employed for forward flight.

More specifically, the thrust-producing device herein proposed is normally mounted in the vertical position on the aircraft for unrestricted movement in multiple degrees of freedom relative thereto so as to constitute in effect a gyroscope with the vector sum of all lift produced thereby disposed in a preselected direction relative to the center of gravity of the aircraft. In its preferred form the device so mounted is disposed above the center of gravity of the aircraft which may thereby swing freely like a pendulum therefrom. Also, the vector sum of the lift forces of the device is made to pass vertically through the center of gravity of the aircraft.

In addition, this thrust-producing device is mounted for relative movement on the aircraft, for example, being connected to the outer end of a rigid, retractable arm connected to the aircraft and operable to move the device inwardly of the aircraft and retain it in fixed position for horizontal flight. This mount accommodates additional drive means for the independent rotation of the device on its retractable arm whereby it may be moved from a vertical to a horizontal position where it serves or assists to drive the aircraft in level flight.

With the above and other objects in view, as will be apparent, this invention consists in the construction, combination and arrangement of parts all as hereinafter more fully described, claimed and illustrated in the accompanying drawings wherein:

FIGURE 2 is a front elevation thereof;

Figure 3:
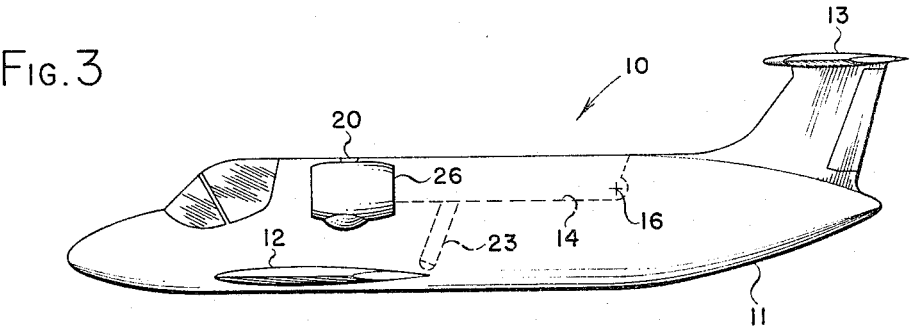
FIGURE 3 is a side elevation thereof.

FIGURE 5 is an isometric view of a fragment of the aircraft to show the mount by which the thrust-producing device is connected to the aircraft together with the means for moving it to and from the vertical and horizontal positions corresponding to the hover and forward flight modes, respectively; and FIGURE 6 is a detail of one of the releasable drive means associated with the thrust-producing device to rotate it to and from relative vertical and horizontal positions and retain it in such positions.

Referring more particularly to the drawings, 10 designates a VTOL type aircraft including a fuselage 11, a wing 12 and a so-called "T" tail 13. Medially of its length the top of the fuselage 11 is slotted or grooved as at 14 to receive and accommodate a rigid lever or arm 15. At one of its ends the arm 15 is pivotally connected at 16 to fuselage structure whereby it is free to swing to and from positions totally within the slot 14 and projecting outwardly therefrom laterally of the fuselage 11.

At its other end the arm 15 terminates in a bearing 17 transversely mounted therein and adapted to receive and pass a shaft 18. The shaft 18 is thus freely rotatable in the bearing 17 and intersects the arm 15 substantially at right angles. A transverse slot 19 is provided in the fuselage 11 to receive the shaft 18 and bearing 17 when the arm 15 is retracted as above described.

The transverse dimensions of the arm 15 are substantially equal to those of the slot 14 to the end that it substantially fills the slot when totally retracted and its outer surface is contoured to form a smooth and uninterrupted continuation of the external surface of the fuselage 11 when so disposed. For similar reasons a fairing 20 secured to and extending from the arm 15 overlies and encloses the shaft 18. A streamlined fairing 21 projects laterally from each side of the fuselage 11, each defining a passage 22 in alignment with the associated slot 19 to enclose the portion of the shaft 18 projecting beyond the fuselage 11 when the arm 15 is retracted.

One end of a power device such as an actuator 23 is pivotally connected to the arm 15 medially of its length. The other end of this actuator 23 is similarly connected to fuselage structure whereby the extension and contraction thereof projects and retracts the arm 15 to and from its extreme positions. This actuator may be pneumatically, hydraulically, electrically or mechanically powered and its operation is controlled by any standard or conventional means.

Adjacent its free end the arm 15 is adapted to connect a thrust-producing device by which the aircraft 10 is powered in the vertical mode and by which the aircraft 10 may also be powered in the horizontal or level flight mode. In the preferred embodiment of the drawings, such thrust-producing device comprises a pair of jet engines 24 one carried at each outer or free end of the shaft 18. More specifically, each outer end of the shaft 18 terminates in a ring or collar 25 that is immovably secured thereto. Each collar 25 is adapted to rotatably mount trunnions 27 that project laterally from the associated engine 24 adjacent the forward end thereof to be disposed at right angles to the shaft 18. Each shaft or axle collar assembly is shrouded by a cowling 26 and constitutes a gimbal on which each of the engines 24 is suspended at all times with its longitudinal center line normally in a vertical position.

Figure 4:
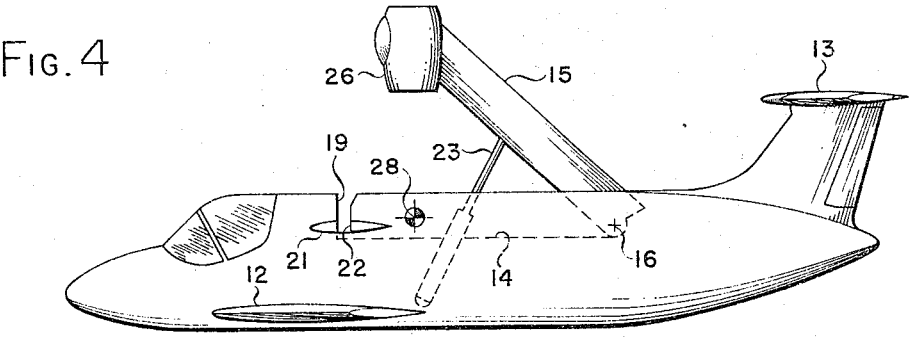
FIGURE 4 is a view similar to FIGURE 3 with the thrust-producing device shown in the vertical position corresponding to the vertical flight or hover mode of the aircraft.
Figure 1:
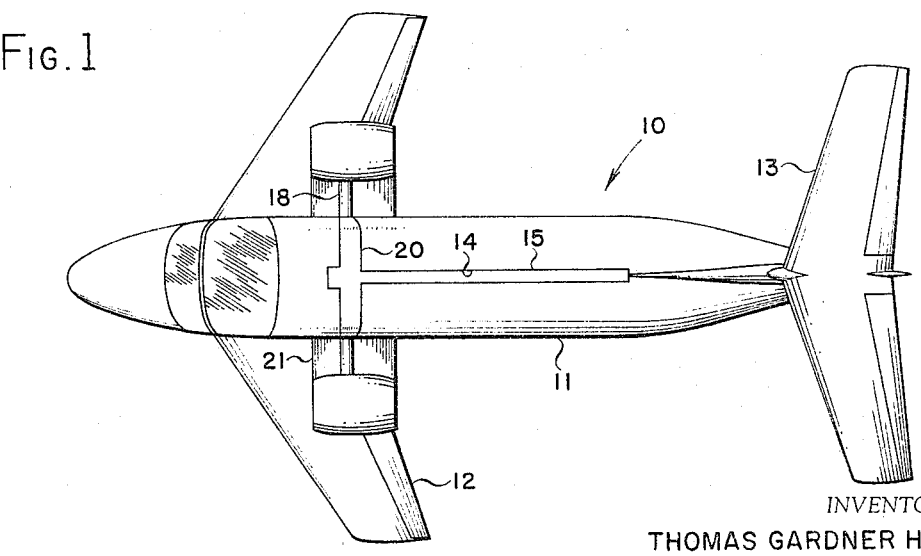
FIGURE 1 is a plan view of a VTOL type aircraft incorporating a thrust system constructed in accordance with the teaching hereof to show a preferred embodiment of the present invention, the thrust-producing device being shown in the horizontal position corresponding to the forward flight mode of the aircraft.

In order to operate the aircraft 10 in vertical flight or hover, the actuator 23 is energized to extend it and thereby swing the arm 15 outwardly of the fuselage 11. The engines 24 are thus raised above the fuselage with their respective longitudinal center lines disposed in the direction of the force of gravity acting on the aircraft 10 since the engines are both freely rotatable in their respective collars 25 in two degrees of freedom. In this position the center of gravity of the aircraft 10 is located at 28 (FIGURE 4) and the engines 24 straddle the fuselage 11 so that when operating their exhaust gases pass clear of the aircraft without adverse effect thereon. Operation of the engines 24 thus disposed produces the necessary lift and sustaining forces for vertical and hover flight of the aircraft 10.

Since the engines 24 are gimballed, they act as gyroscopes and are inclined to remain fixed in space while the aircraft 10 may deviate angularly to perform virtually all maneuvers. Hence, the resultant lift vector does not tilt with the aircraft 10 and when the aircraft is level, this vector passes through the center of gravity 28 of the aircraft. Automatic stability and hover control of the aircraft is thus assured inasmuch as any aircraft angular deviation in roll or pitch will displace the aircraft center of gravity with respect to the fixed direction of the lift vector allowing gravity to create a restoring force as in a pendulum.

Additional means constituting a clutch and drive mechanism in the form of a gear train that is power driven and a releasable engagement is provided to render the gimbal mounts of the engines 24 ineffective when desired. Thus the engines 24 may be positioned with their thrust in a selected, fixed direction as above described and also forcibly rotated to and from the vertical and horizontal positions corresponding to the vertical and forward flight modes respectively.

For this purpose, a driven gear 29 is secured to and projects laterally from each engine trunnion 27 as well as from the shaft 18. Associated with each such gear 29 is a pinion gear 30 hinged to adjacent structure as for example by a bellcrank lever 32 for movement to and from engagement with its coacting gear 29 by an actuator 31. During the vertical or hover mode of the aircraft 10, the actuators 31 are normally contracted to maintain the several coacting gears 29 and 30 disengaged. However, the several actuators 31 may be extended to engage their respective coacting gears 29 and 30 thereby locking the gimbal mounts of the engines 24 as well as the shaft 18 against unrestricted movement.

A drive which may be in the form of an electric motor 33 or the like is operatively connected to the shaft of each pinion gear 30 for the rotation thereof to impart corresponding movement to the associated gear 29 when engaged or in mesh causing the rotation of each engine 24 accordingly. Thus, the engines 24 are rotated by the axle 18 to and from the vertical and horizontal positions as well as on their trunnions 27 to control the direction of their thrust. Any conventional control linkage or circuitry may be employed to energize the several actuators 31 and motors 33 and to coordinate their operation. Moreover, such controls may be pilot-operated or automatic in response to activation of associated equipment or other programmed intelligence.

While a particular embodiment of the invention has been hereinabove described and illustrated, it will be obvious to those skilled in the art that various changes and modifications may be made without departing from the invention, the scope of which is to be limited only by the appended claims.

What is claimed is:

1. A thrust system for VTOL aircraft comprising a lift-producing device mounted on said aircraft for unrestricted movement relative thereto in multiple degrees of freedom and disposed above the center of gravity of the aircraft when the aircraft is in a substantially horizontal position with the vector sum of the forces produced thereby passing vertically through the center of gravity of the aircraft, including releasable engagement means, operative on said device, to hold it in a selected, fixed position relative to the aircraft, whereby said vector sum of the forces are directed aft of said aircraft.

2. A thrust system for VTOL aircraft comprising a lift-producing device mounted on said aircraft for unrestricted movement relative thereto in multiple degrees of freedom and disposed above the center of gravity of the aircraft when the aircraft is in a substantially horizontal position with the vector sum of the forces produced thereby passing vertically through the center of gravity of the aircraft, including releasable engagement means, operative on said device, to hold it in a selected, fixed position relative to the aircraft, wherein said device is mounted in a gimbal and said engagement means is operative to releasably secure said gimbal rendering it inoperative, and including a drive operative subsequent to operation of said engagement means to move said device to a position where the vector sum of forces produced thereby are directed aft of said aircraft.

3. A thrust system for VTOL aircraft comprising a thrust-producing device mounted on said aircraft for protraction to and retraction from a position above and in spaced relation to the aircraft, said device being supported when disposed in the protracted position in a multiple degree of freedom gimbal with the vector sum of the forces produced thereby passing vertically through the center of gravity of the aircraft, and an engagement operative to secure said gimbal against the freedom aforesaid in a position compatible with forward flight of the aircraft when disposed in the retracted position.

4. A thrust system for VTOL aircraft comprising a thrust-producing device, a protractable and retractable mount connecting said device to the aircraft by which it is disposed in preselected, relative, vertical and horizontal positions with reference to the center of gravity of the aircraft corresponding to vertical and forward flight respectively, said mount including a multiple degree of freedom gimbal whereby the vector sum of the forces produced by said device when disposed in the protracted position passes vertically through the center of gravity of the aircraft, and means rendering said gimbal inoperative for disposition of said device in the retracted position.

5. A thrust system for VTOL aircraft comprising a thrust-producing device, an extendable and retractable arm connected at its opposite ends to the aircraft and said device respectively, a multiple degree of freedom gimbal mounting said device on said arm, an engagement operative between said gimbal and said arm to prevent the freedom aforesaid, and a drive connected to said engagement and concurrently operable therewith to move said device relative to said arm.

6. A thrust system for VTOL aircraft comprising a thrust-producing device, a rigid arm pivotally connected at its opposite ends to the aircraft and said device respectively, an actuator connected at opposite ends to said aircraft and said arm respectively and operative to swing the arm outwardly of the aircraft and thereby dispose the device in spaced relation to the aircraft, a multiple degree of freedom gimbal mounting said device on said arm with the vector sum of thrust produced by said device when disposed outwardly of the aircraft as aforesaid passing vertically through the center of gravity of the aircraft, an engagement operative between said gimbal and said arm to prevent the freedom aforesaid, and a drive operatively connected to said engagement to move said device relative to said arm to a position where it produces forward movement of the aircraft.

7. A thrust system for VTOL aircraft comprising a thrust-producing device, an extendable and retractable arm connecting said device to internal structure of the aircraft, a multiple degree of freedom gimbal mounting said device on the end of said arm remote from said internal structure, means operative to secure said gimbal against such freedom in a selected, fixed position relative to said arm, a slot in said aircraft adapted to receive said arm when retracted, and an external surface on said arm contoured to conform to the surface of said aircraft defining said slot to thereby establish an aerodynamically uninterrupted exterior for said aircraft when said arm is retracted.

8. The thrust system of claim 7 wherein said means includes a clutch and drive mechanism operative between said gimbal and said arm to prevent the freedom aforesaid and to permit controlled movement of said device relative to said arm.

9. The thrust system of claim 8 wherein said device comprises at least one jet engine, and said gimbal is disposed laterally of said arm to position each said engine externally of said aircraft when the arm is retracted.

References Cited by the Examiner
UNITED STATES PATENTS

| | | | |
|---|---|---|---|
| 1,964,179 | 6/1934 | Roth et al. | 244—56 X |
| 2,497,590 | 2/1950 | Drill | 244—56 X |
| 2,865,579 | 12/1958 | Caillette | 244—52 |
| 2,937,492 | 5/1960 | Lehberger | 244—23 X |

FOREIGN PATENTS 1,092,559  11/1954  France.

MILTON BUCHLER, *Primary Examiner.*

L. C. HALL, B. BELKIN, *Assistant Examiners.*